(12) United States Patent
Lee et al.

(10) Patent No.: US 8,385,838 B2
(45) Date of Patent: Feb. 26, 2013

(54) METHOD OF TRANSMITTING FEEDBACK INFORMATION IN MULTIPLE ANTENNA SYSTEM

(75) Inventors: Wook Bong Lee, Anyang-si (KR); Bin Chul Ihm, Anyang-si (KR); Moon Il Lee, Anyang-si (KR); Jae Wan Kim, Anyang-si (KR); Jin Young Chun, Anyang-si (KR)

(73) Assignee: LG Electronics Inc., Seoul (KR)

( * ) Notice: Subject to any disclaimer, the term of this patent is extended or adjusted under 35 U.S.C. 154(b) by 537 days.

(21) Appl. No.: 12/452,614

(22) PCT Filed: Jul. 9, 2008

(86) PCT No.: PCT/KR2008/004046
§ 371 (c)(1),
(2), (4) Date: Jan. 12, 2010

(87) PCT Pub. No.: WO2009/011514
PCT Pub. Date: Jan. 22, 2009

(65) Prior Publication Data
US 2010/0151795 A1  Jun. 17, 2010

(30) Foreign Application Priority Data
Jul. 13, 2007 (KR) .................. 10-2007-0070764

(51) Int. Cl.
*H04B 1/00* (2006.01)

(52) U.S. Cl. .... 455/69; 455/67.16; 455/101; 455/562.1; 375/267; 370/210; 370/338

(58) Field of Classification Search ............ 455/67.16, 455/101, 562.1, 69; 375/267; 370/210, 338
See application file for complete search history.

(56) References Cited

U.S. PATENT DOCUMENTS

| | | | |
|---|---|---|---|
| 2003/0148738 A1* | 8/2003 | Das et al. | 455/67.5 |
| 2004/0165676 A1* | 8/2004 | Krishnan et al. | 375/267 |
| 2006/0176803 A1* | 8/2006 | Oh et al. | 370/210 |
| 2007/0097856 A1* | 5/2007 | Wang et al. | 370/210 |

FOREIGN PATENT DOCUMENTS

| | | |
|---|---|---|
| CN | 1592144 | 3/2005 |
| JP | 2004-145474 A | 5/2004 |
| JP | 2006-191315 A | 7/2006 |
| KR | 10-2006-0042523 A | 5/2006 |
| WO | WO-2006/051372 A1 | 5/2006 |

* cited by examiner

*Primary Examiner* — April G Gonzales
(74) *Attorney, Agent, or Firm* — McKenna Long & Aldridge LLP

(57) ABSTRACT

A method of transmitting feedback information in a multiple antenna system is provided. The method includes selecting at least one subband selected from a plurality of subbands according to subband preset information, the subband preset information being a preset on data processing settled for each of the plurality of subbands, and transmitting a subband index of the selected subband. Only a subband index is fed back instead of separately transmitting a precoder index or a modulation and coding scheme (MCS) level index to each UE, thereby reducing feedback overhead.

8 Claims, 3 Drawing Sheets

[Fig. 1]
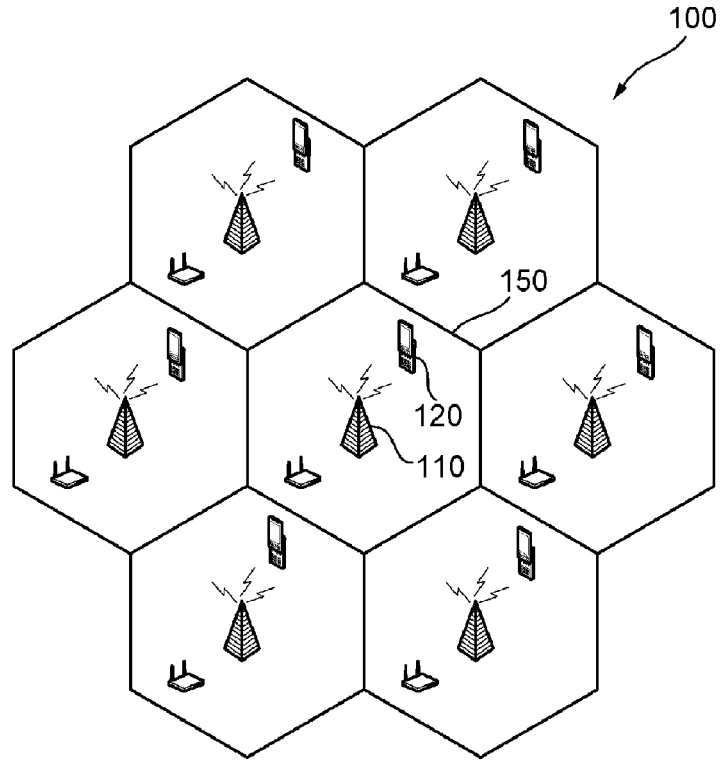
[Fig. 2]
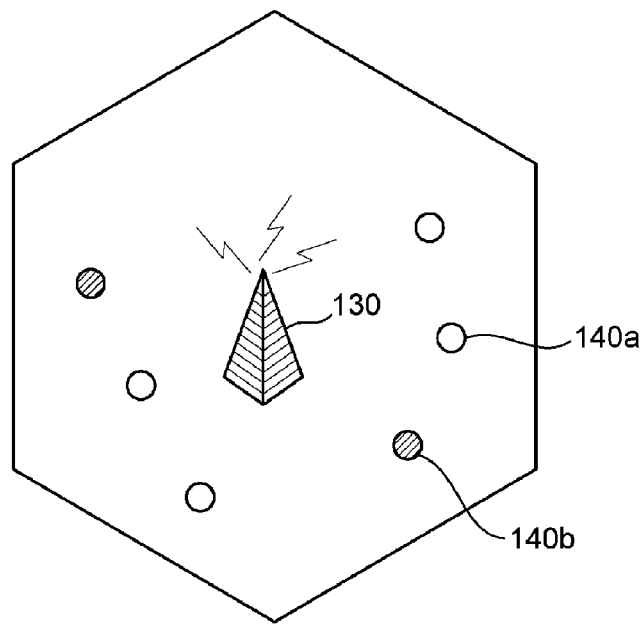
○ BROADCAST  ◍ MULTICAST

[Fig. 3]
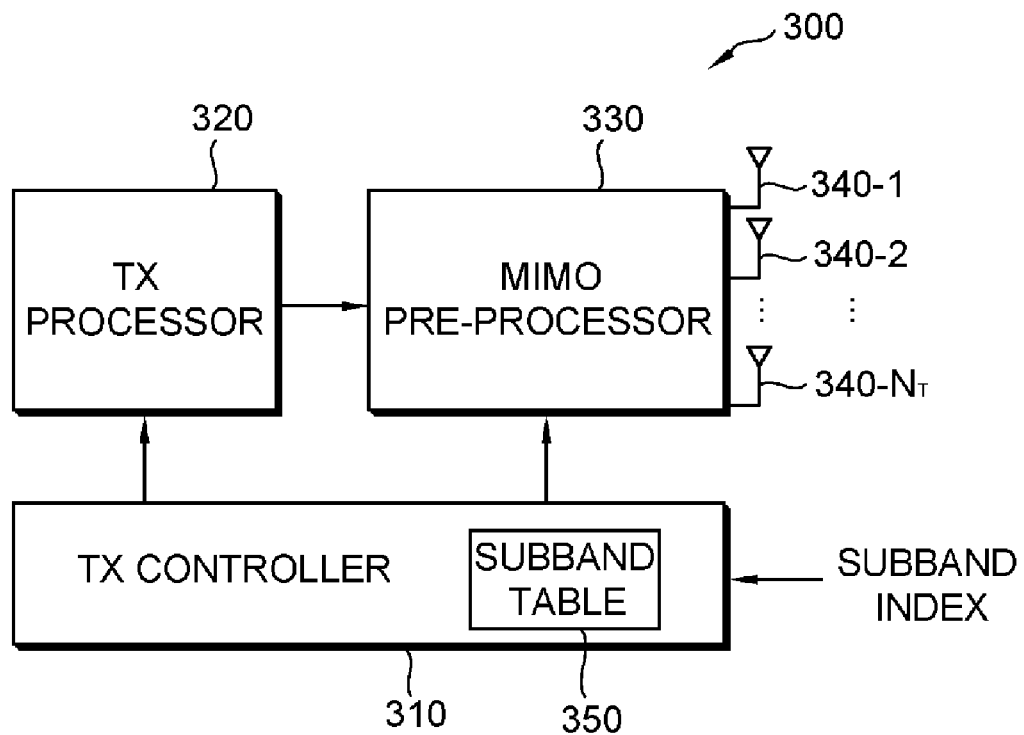
[Fig. 4]
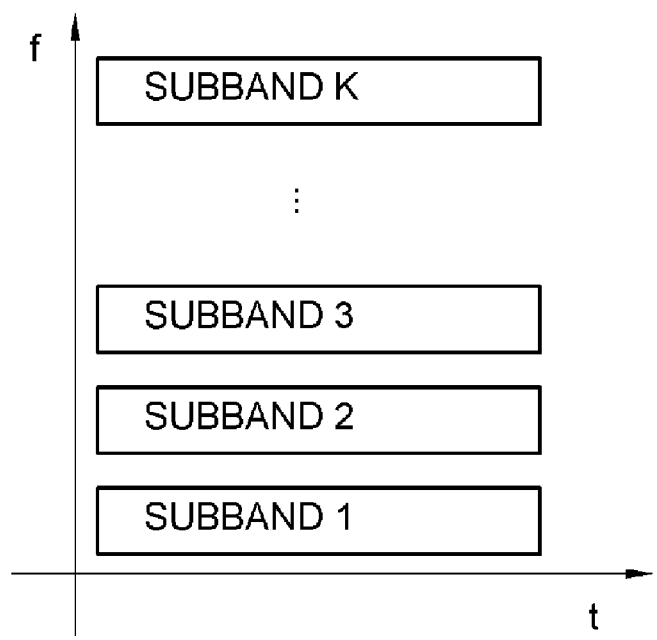

[Fig. 5]
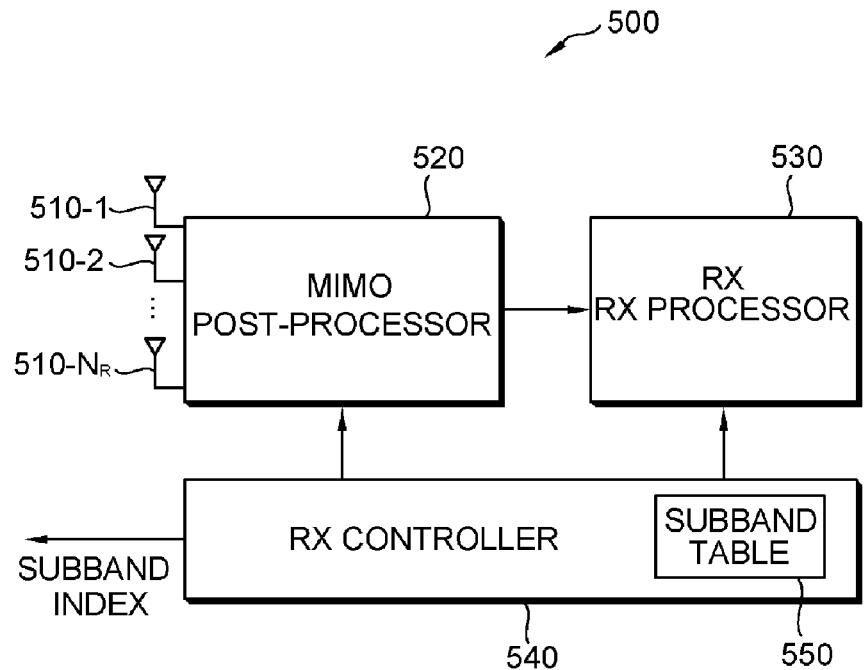
[Fig. 6]
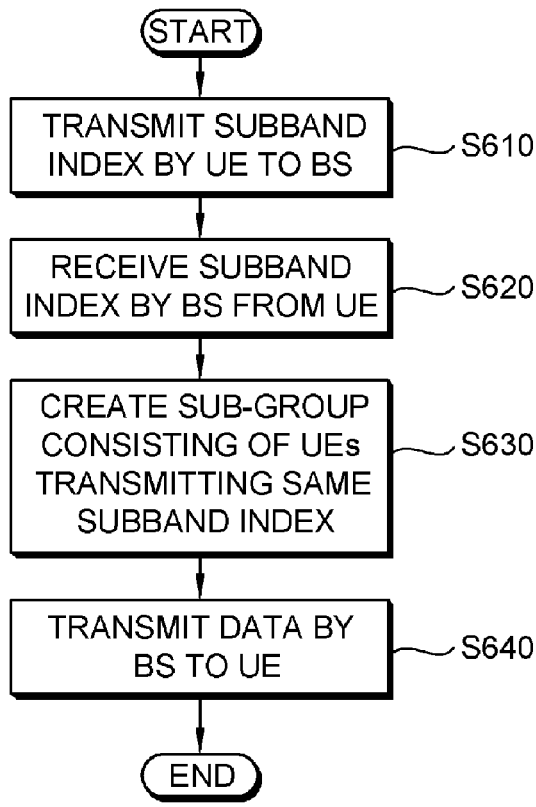

US 8,385,838 B2

METHOD OF TRANSMITTING FEEDBACK INFORMATION IN MULTIPLE ANTENNA SYSTEM

This application is a National Stage Entry of International Application No. PCT/KR2008/004046, filed on Jul. 9, 2008, and claims priority to Korean Patent Application No. 10-2007-0070764, filed Jul. 13, 2007, which is hereby incorporated by reference in its entirety as if fully set forth herein.

TECHNICAL FIELD

The present invention relates to wireless communications, and more particularly, to a method of transmitting feedback information in multiple antenna system.

BACKGROUND ART

Communication services have experienced a fast growing demand, for example, generalization of information communication services, introduction of various multimedia services, and provision of high-quality services. To meet such a demand, various wireless communication techniques have been studied in various fields.

According to service types, multimedia data requires a variety of data rates and a variety of transmission qualities. Therefore, there is a need for a new link adaptation scheme having a different concept from the conventional voice-oriented services. An example of the link adaptation scheme for effective data transmission is an adaptive modulation and coding (AMC) scheme in which a data rate is adaptively changed to fit a channel environment. The data rate is determined by a modulation and coding scheme (MCS) level in association with a predetermined modulation and channel coding combination. The MCS level is determined according to a signal to interference plus noise ratio (SINR), a carrier to interference plus noise ratio (CINR), channel quality information (CQI), etc. To support the AMC scheme, a base station (BS) has to know information on the SINR of a user equipment (UE), and the UE informs the BS of receive (Rx) channel quality by using the CQI or the like.

A multiple input multiple output (MIMO) technique is one of techniques capable of improving communication capacity and communication performance without additional frequency allocation or power increase. That is, spectral efficiency can be improved by increasing both the number of transmit (Tx) antennas and the number of Rx antennas since channel transmission capacity is theoretically increased in proportion to the number of antennas.

The MIMO technique can be classified into a spatial diversity scheme and a spatial multiplexing scheme. The spatial diversity scheme uses various channel paths to increase transmission reliability. The spatial multiplexing scheme improves the data rate by simultaneously transmitting a plurality of data streams. In recently conducted researches, the two schemes are properly combined to obtain advantages of each scheme.

A precoding scheme (or a beamforming scheme) may be used to increase the data rate. When a transmitter intends to transmit data by using the precoding scheme, each data column is multiplied by a Tx weighting factor by using information on a downlink channel from the transmitter to a receiver. Therefore, the transmitter has to know a condition of a downlink channel from each Tx antenna of the transmitter to each Rx antenna of the receiver. For this, the receiver estimates the downlink channel condition, and thereafter feeds back information on the estimated downlink channel condition to the transmitter. However, in order to feed back the downlink channel condition information to the transmitter, a large amount of feedback data has to be transmitted by using an uplink feedback channel.

Therefore, a codebook scheme is introduced to reduce the amount of feedback information. In the codebook scheme, the receiver determines a precoder having a maximum data rate by using a precoder codebook consisting of a limited number of precoders known by both the transmitter and the receiver, and feeds back an index of the precoder to the transmitter. The transmitter transmits data by using a precoder corresponding to the fed-back index of the precoder included in the precoder codebook.

The transmitter having multiple antennas can simultaneously transmit a plurality of Tx signals by broadcast, multicast, and/or unicast transmission. The broadcast transmission denotes that the signals are transmitted to all users within a specific region (e.g., a cell and/or a sector). The multicast transmission denotes that the signals are transmitted to a specific group consisting of at least one user. The unicast transmission denotes that the signals are transmitted to a specific user.

In a point-to-point system such as unicast transmission, precoding is not much problematic. However, since services are collectively provided to a plurality of users in a point-to-multipoint system such as multicast or broadcast transmission using multiple antennas, feedback overhead may occur when each user feeds back separate precoding information and MCS level information to the BS. Moreover, since the MCS level and the precoder are different from one user to another, it is difficult to perform scheduling for suitable coding and beamforming.

Accordingly, when multi-user data is transmitted using multiple antennas, there is a need for a method of effectively transmitting feedback information (e.g., the MCS level, the CQI, or the precoder) to a BS.

DISCLOSURE OF INVENTION

Technical Problem

The present invention provides a method of transmitting feedback information in a multiple antenna system.

Technical Solution

A method of transmitting feedback information in a multiple antenna system is provided. The method includes selecting at least one subband selected from a plurality of subbands according to subband preset information, the subband preset information being a preset on data processing settled for each of the plurality of subbands, and transmitting a subband index of the selected subband.

A method of transmitting data using multiple antennas is provided. The method includes receiving feedback information from a UE, the feedback information comprising at least one subband index from a user equipment (UE), the subband index indicating a subband in a plurality of subbands, processing downlink data according to subband preset information, the subband preset information being a preset on data processing settled for each of the plurality of subbands, and transmitting the downlink data to the UE.

Advantageous Effects

In unicast transmission, only a subband index fed back instead of separately transmitting precoder index, thereby reducing feedback overhead. In multicast or broadcast transmission for simultaneously transmitting the same data to a plurality of user equipments (UEs), only a subband index is fed back instead of separately transmitting a precoder index or a modulation and coding scheme (MCS) level index to each UE, thereby reducing feedback overhead. In addition, UEs, which are included in the plurality of UEs and to which the same-type precoding can be applied, are grouped into a subgroup so as to be collectively processed. Therefore, scheduling of BS can be easily performed and a precoding/beamforming gain can be obtained.

BRIEF DESCRIPTION OF THE DRAWINGS

FIG. 1 shows a wireless communication system.

FIG. 2 shows one cell including multiple users.

FIG. 3 is a block diagram of a base station (BS) according to an embodiment of the present invention.

FIG. 4 is a graph showing a subband according to the present invention.

FIG. 5 is a block diagram of a user equipment (UE) according to an embodiment of the present invention.

FIG. 6 is a flowchart showing a method of transmitting a subband index according to an embodiment of the present invention.

MODE FOR THE INVENTION

FIG. 1 shows a wireless communication system.

Referring to FIG. 1, a wireless communication system 100 includes a plurality of base stations (BSs) 110 deployed over the entire system. The BS 110 is generally a fixed station, and may be referred to as another terminology, such as a node-B, a base transceiver system (BTS), an access point, etc. A user equipment (UE) 120 may be fixed or mobile, and may be referred to as another terminology, such as a mobile station (MS), a user terminal (UT), a subscriber station (SS), a wireless device, etc. Hereinafter, a downlink is defined as a communication link from the BS 110 to the UE 120, and an uplink is defined as a communication link from the UE 120 to the BS 110. A service area of one BS 110 is referred to as a cell 150. One cell 150 can be divided into a plurality of sectors (not shown). Although 7 cells 150 are shown in FIG. 1, deployment or the number of cells 150 may vary depending on the communication system 100.

FIG. 2 shows one cell including multiple users.

Referring to FIG. 2, a BS 130 having multiple antennas transmits multiplexed multiple transmit (Tx) signals to respective UEs 140a and 140b. The UEs 140a and 140b may have one or more antennas. A communication system may be either a multiple input multiple output (MIMO) system or a multiple input single output (MISO) system. The MIMO system uses a plurality of Tx antennas and a plurality of receive (Rx) antennas. The MISO system uses a plurality of Tx antennas and one Rx antenna.

The BS 130 having the multiple antennas can transmit a plurality of signals simultaneously by broadcast or multicast transmission (hereinafter, referred to as multi-user data transmission) as well as unicast transmission. In the broadcast transmission, the signals are transmitted to all users within a specific region (e.g., a cell and/or a sector). In the multicast transmission, the signals are transmitted to a specific group consisting of at least one user. In the unicast transmission, the signals are transmitted to a specific user. For example, all UEs (i.e., the UEs 140a and 140b) within a cell can receive broadcast signals. In addition, the UE 140b belonging to a specific group can receive multicast signals. From the perspective of the UEs, each of the UEs 140a and 140b can receive signals required for themselves. The first UE 140a receives only the broadcast signals. The second UE 140b receives both the broadcast signals and the multicast signals.

FIG. 3 is a block diagram of a BS according to an embodiment of the present invention.

Referring to FIG. 3, a BS 300 includes a Tx controller 310, a Tx processor 320, a MIMO pre-processor 330, and antennas 340-1, . . . , 340-NT. The Tx controller 310 includes a subband table 350 and receives a subband index from a UE. The Tx controller 310 transmits modulation and coding scheme (MCS) level information based on the subband index to the Tx processor 320, and transmits a precoder based on the subband index to the MIMO pre-processor 330. The subband table 350 and the subband index will be described below.

The Tx processor 320 receives the MCS level information from the Tx controller 310. The Tx processor 320 encodes data according to the MCS level and thus generates coded data. Further, the Tx processor 320 maps the coded data to a data symbol for representing a location on a signal constellation.

The MIMO pre-processor 330 receives a precoder from the Tx controller 310 and generates a Tx symbol by performing precoding on the data symbol. The precoding is a scheme for performing pre-processing by multiplying the precoder (i.e., a vector or a matrix) by the data symbol to be transmitted. The Tx symbol is transmitted to the UE through the antennas 340-1, . . . ,340-NT.

Now, the subband table and the subband index will be described.

Each user transmits one or more subband indices to the BS. The subband is a basic unit in a logical region or a physical region. For example, the subband may be a unit for identifying a frequency band, and may be referred to as a resource block, a resource tile, a bin, etc.

FIG. 4 is a graph showing a subband according to the present invention. The subband may be a logical region or a physical region.

Referring to FIG. 4, the x-axis represents a time domain, and the y-axis represents a frequency domain in a system. The frequency domain can be divided into a plurality of subbands as shown in FIG. 4. The subband may include a plurality subcarriers. A bandwidth of the subband may be a region which is symmetrically or asymmetrically divided from all or some parts of a frequency band used by the system based on a frequency division multiplexing (FDM)/frequency division multiple access (FDMA) scheme or an orthogonal frequency division multiplexing (OFDM)/orthogonal frequency division multiplexing (OFDMA) scheme. Although the frequency domain is divided into symmetrical subbands in FIG. 4, it may be asymmetrically divided according to a system characteristic. A BS and a UE divide the frequency band of the system into a plurality of subbands and assign an index to each subband.

Referring again to FIG. 3, the BS and the UE include the subband table 350. The subband table 350 includes subband preset information which gives a preset on data processing settled for each of the the plurality of subbands. The UE finds a subband providing a desired performance according to the subband preset information of each subband. When an index of each subband is informed to the BS, the BS transmits data processed according to the subband preset information to the UE through the subband.

For example, the subband preset information may include the precoder. For another example, the subband preset information may include the MCS level. For still another example, the subband present information may include both the precoder and the MCS level. The subband preset information can be configured with various combinations of the MCS level and/or the precoder for each subband. The subband preset information may be known by both the UE and the BS according to a protocol pre-defined between the UE and the BS. Alternatively, the subband preset information may be transmitted by the BS to the UE. When the BS transmits the subband preset information to the UE, the subband preset information may be transmitted through a downlink control channel.

According to an embodiment, the subband table 350 can be configured as shown in Table 1 below.

TABLE 1

| Subband Index | MCS Level Index | Precoder Index |
|---|---|---|
| 0 | MCS0 | Precoder0 |
| 1 | MCS0 | Precoder1 |
| 2 | MCS0 | Precoder2 |
| 3 | MCS0 | Precoder3 |
| 4 | MCS1 | Precoder0 |
| 5 | MCS1 | Precoder1 |
| 6 | MCS1 | Precoder2 |
| 7 | MCS1 | Precoder3 |
| 8 | MCS2 | Precoder0 |
| 9 | MCS2 | Precoder1 |
| 10 | MCS2 | Precoder2 |
| 11 | MCS2 | Precoder3 |
| 12 | MCS0 | Precoder0 |
| 13 | MCS0 | Precoder1 |
| 14 | MCS0 | Precoder2 |
| 15 | MCS0 | Precoder3 |
| 16 | MCS1 | Precoder0 |
| ... | ... | ... |
| K | MCS2 | Precoder3 |

Table 1 shows an example of the subband table 350 in which 3 MCS levels and 4 precoders are combined. A subband index can be in the range of 0 to K (where K is integer greater than or equal to 0). MCS0 to MCS2 denote indices of the MCS levels. For example, MCS0, MCS1, and MCS2 respectively denote binary phase shift key (BPSK), quadrature phase shift key (QPSK), and 16 quadrature amplitude modulation (QAM). A coding scheme can use a $1/3$ turbo code. Precoder0 to Precoder3 denote indices of precoders (or beamforming vectors) included in a codebook pre-defined according to each channel environment.

The UE determines transmission performance for each subband by using the precoders and the MCS levels determined for all subbands according to Table 1 above. When a subband having an optimal performance is determined, the UE transmits an index of the determined subband to the BS. In a specific channel environment at an arbitrary time point, if the UE determines that the optimal performance is obtained in a case of a 0th subband based on MCS0 and Precoder0, the UE transmits a subband index 0 to the BS. If the UE determines that the optimal performance is obtained in a case of a 6th subband based on MCS1 and Precoder2 other than the 0th subband, the UE can transmit to the BS a subband index 6 along with the subband index 0.

According to another embodiment, the subband table 350 can be configured as shown in Table 2 below.

TABLE 2

| Subband Index | Precoder Index |
|---|---|
| 0 | Precoder0 |
| 1 | Precoder1 |
| 2 | Precoder2 |
| 3 | Precoder3 |
| 4 | Precoder0 |
| 5 | Precoder1 |
| 6 | Precoder2 |
| 7 | Precoder3 |
| 8 | Precoder0 |
| 9 | Precoder1 |
| 10 | Precoder2 |
| 11 | Precoder3 |
| 12 | Precoder0 |
| 13 | Precoder1 |
| 14 | Precoder2 |
| 15 | Precoder3 |
| 16 | Precoder0 |
| ... | ... |
| K | Precoder3 |

Table 2 is different from Table 1 above in that each subband is determined only with precoder indices while not considering MCS level indices. That is, if the UE desires to receive data by using Precoder0, the UE can transmit to the BS only a subband index 0 or a plurality of subband indices corresponding to Precoder0, e.g., the subband indices 4, 8, 12, etc.

When the UE selects a channel quality information (CQI)/signal to interference plus noise ratio (SINR)/carrier to interference plus noise ratio (CINR)/MCS level, a desired precoder, a desired subband, or the like, selection is preferably performed for a specific time period rather than being performed according to a channel condition which is frequently modified. After determining the CQI/SINR/CINR/MCS level, the precoder index, the subband, etc., the UE may inform the BS the determination result periodically or occasionally if necessary. In addition, the UE may inform the BS the determination result when the BS requests the UE to send the control information.

When each UE prefers a different precoder or a different MCS level in the transmission of multi-user data using multiple antennas, it may be difficult for the BS to properly select the precoder and/or the MCS level. In this case, by using the subband table 350 in which the MCS level and/or the precoder are predetermined for each subband, feedback overhead can be reduced from the perspective of the UE since the UE feeds back only a subband index without having to additionally inform the BS of the MCS level and/or the precoder. Further, effective transmission can be achieved from the perspective of the BS since data is transmitted by using a specific MCS level and/or a specific precoder by collectively handling UEs that prefer the same subband index, which is different from the conventional method in which scheduling is performed by using various MCS levels and/or precoders for respective UEs.

FIG. 5 is a block diagram of a UE according to an embodiment of the present invention.

Referring to FIG. 5, a UE 500 includes antennas 510-1, . . . , 510-NR, a MIMO post-processor 520, an Rx processor 530, and an Rx controller 540.

Signals received from the antennas 510-1, . . . , 510-NR are input to the MIMO post-processor 520. The MIMO post-processor 520 performs post-processing corresponding to the pre-processing of the MIMO pre-processor 300 of FIG. 3 and thus converts a Tx symbol into a data symbol. The Rx processor 530 de-maps the data symbol output from the MIMO post-processor 520 into coded data, and restores the coded data into original data by decoding the coded data.

The Rx controller 540 includes a subband table 550. The subband table 550 is the same as the subband table 350 of the BS. By using the subband table 550, the Rx controller 540 determines transmission performance for each subband according to an MCS level and/or a precoder which are assigned for each subband. The Rx controller 540 transmits to the BS a subband index of a subband for providing optimal transmission performance as a result of determining the transmission performance. Thereafter, the Rx controller 540 inputs the MCS level based on the subband index to the Rx processor 530, and inputs the precoder based on the subband index to the MIMO post-processor 520.

The BS 300 of FIG. 3 and the UE 500 can be also applied without alternation not only to a scheme (e.g., OFDM/OFDMA scheme) using multiple carriers but also to other types of wireless access schemes (e.g., time division multiple access (TDMA), code division multiple access (CDMA), etc.).

FIG. 6 is a flowchart showing a method of transmitting a subband index according to an embodiment of the present invention.

Referring to FIG. 6, a UE transmits the subband index to a BS (step S610). The UE may be a plurality of UEs 500 of FIG. 5 for transmitting multi-user data. Each UE determines transmission performance of each subband by using an MCS level and/or a precoder which are determined for each subband, and thereafter transmits to the BS one or a plurality of subband indices of a subband having an optimal performance.

The BS receives a subband index from the UE (step S620). When the multi-user data is transmitted, the BS receives the subband index from each of a plurality of UEs according to a service.

The BS creates a sub-group consisting of UEs which have transmitted the same subband index (step S630). In this case, the BS assigns the same connection identifier (CID) to the UEs belonging to the sub-group, and transmits data as one encoding block. The CID is an identifier for confirming an equivalent media access control (MAC) connection between the UE and the BS. Various types of CID are provided according to a connection status between the UE and the BS. A ranging CID is used in a ranging procedure between the UE and the BS for the purpose of obtaining an exact timing offset between the UE and the BS, for regulating initial Tx power, and for periodically tracking a received signal strength. The same multicast CID is assigned for downlink multicast services. A broadcast CID is assigned to all UEs in order to use broadcast information.

As such, if the sub-group is created to transmit data by using one encoding block and the same precoder, waste of a MAP message for allocating resources to the UEs can be reduced, and a channel coding gain can be obtained. Table 3 below shows an example of creating the sub-group for respective UEs.

TABLE 3

| UE | Subband Index | Sub Group |
|---|---|---|
| 1 | 0 | 1 |
| 2 | 0 | 1 |
| 3 | 2 | 2 |
| 4 | 1 | 3 |
| 5 | 2 | 2 |
| 6 | 1 | 3 |

In Table 3, 1st and 2nd UEs transmit a subband index 0 and belong to a 1st sub-group. 3rd and 5th UEs transmit a subband index 2 and belong to a 2nd sub-group. 4th and 6th UEs transmit a subband index 1 and belong to a 3rd sub-group.

The BS transmits data to the UE (step S640). The BS performs channel-coding on data according to an MCS level based on a subband index received from the UE and modulates the coded data in the subband. Thereafter, the BS performs pre-processing on the modulated data by using a precoder based on the subband index and transmits the resultant data to the UE through multiple antennas.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of transmitting feedback information in a multiple antenna system, the method performed by a mobile terminal and comprising:
    configuring a feedback content including a subband index, which indicates a subband among a plurality of subbands,
    wherein a plurality of pre-coder indexes are mapped to a plurality of subband indexes such that contiguous pre-coder indexes are cyclically mapped to contiguous subband indexes,
    wherein a pre-coder index indicating a pre-coding matrix for the subband and used by a base station is determined according to the subband index,
    transmitting the feedback content to the base station on an uplink control channel.

2. The method of claim 1, wherein the feedback content does not include additional information indicating the pre-coding matrix for the subband.

3. The method of claim 1, wherein a pre-coding matrix is the same for UEs transmitting same subband index, and UEs transmitting the same subband index belong to a same group.

4. The method of claim 1, wherein the subband index does not indicate a MCS level of the subband.

5. A mobile terminal for transmitting feedback information in a multiple antenna system, the mobile terminal comprising:
    a processor configured for:
    configuring a feedback content including a subband index, which indicates a subband among a plurality of subbands,
    wherein a plurality of pre-coder indexes are mapped to a plurality of subband indexes such that contiguous pre-coder indexes are cyclically mapped to contiguous subband indexes,
    wherein a pre-coder index indicating a pre-coding matrix for the subband and used by a base station is determined according to the subband index,
    transmitting the feedback content to the base station on an uplink control channel.

6. The mobile terminal of claim 5, wherein the feedback content does not include additional information indicating the pre-coding matrix for the subband.

7. The mobile terminal of claim 5, wherein a pre-coding matrix is the same for UEs transmitting same subband index, and UEs transmitting the same subband index belong to a same group.

8. The mobile terminal of claim 5, wherein the subband index does not indicate a MCS level of the subband.

* * * * *